United States Patent [19]

Stanford et al.

[11] Patent Number: 5,137,549
[45] Date of Patent: Aug. 11, 1992

[54] TWO STAGE SUPER-ENRICHED OXYGEN CONCENTRATOR

[75] Inventors: Raymond A. Stanford, Rock Island, Ill.; Charles E. Jenkins, New Albany, Ind.

[73] Assignee: VBM Corporation, Louisville, Ky.

[21] Appl. No.: 675,445

[22] Filed: Mar. 26, 1991

Related U.S. Application Data

[63] Continuation-in-part of Ser. No. 674,789, Mar. 25, 1991, and Ser. No. 464,244, Jan. 12, 1990, Pat. No. 5,002,591.

[51] Int. Cl.⁵ ............................................. B01D 53/04
[52] U.S. Cl. .................................... 55/26; 55/31; 55/33; 55/58; 55/62; 55/68; 55/75; 55/162; 55/179; 55/389
[58] Field of Search .............. 55/25, 26, 31, 33, 58, 55/62, 68, 74, 75, 161–163, 179, 387, 389

[56] References Cited

U.S. PATENT DOCUMENTS

| | | | |
|---|---|---|---|
| 4,190,424 | 2/1980 | Armond et al. | 55/58 |
| 4,194,890 | 3/1980 | McCombs et al. | 55/25 X |
| 4,376,640 | 3/1983 | Vo | 55/58 X |
| 4,386,945 | 6/1983 | Gardner | 55/26 |
| 4,404,004 | 9/1983 | Knoblauch et al. | 55/25 |
| 4,468,238 | 8/1984 | Matsui et al. | 55/26 |
| 4,529,412 | 7/1985 | Hayashi et al. | 55/25 |
| 4,552,571 | 11/1985 | Dechene | 55/25 X |
| 4,661,125 | 4/1987 | Haruna et al. | 55/26 |
| 4,756,723 | 7/1988 | Sircar | 55/25 |
| 4,781,735 | 11/1988 | Tagawa et al. | 55/26 |
| 4,810,265 | 3/1989 | Lagree et al. | 55/26 |
| 4,813,979 | 3/1989 | Miller et al. | 55/25 |
| 4,840,647 | 6/1989 | Hay | 55/58 X |
| 4,869,733 | 9/1989 | Stanford | 55/21 |
| 4,880,443 | 11/1989 | Miller et al. | 55/26 |
| 4,913,709 | 4/1990 | Kumar | 55/26 |
| 4,914,218 | 4/1990 | Kumar et al. | 55/26 |
| 4,915,711 | 4/1990 | Kumar | 55/26 |
| 4,917,710 | 4/1990 | Haruna et al. | 55/26 |
| 4,985,052 | 1/1991 | Haruna et al. | 55/26 |
| 5,002,591 | 3/1991 | Stanford | 55/26 |
| 5,026,406 | 6/1991 | Kumar | 55/26 |

FOREIGN PATENT DOCUMENTS

| | | | |
|---|---|---|---|
| 1-262919 | 10/1989 | Japan | 55/26 |
| 2154895 | 9/1985 | United Kingdom | 55/26 |

*Primary Examiner*—Robert Spitzer
*Attorney, Agent, or Firm*—Fay, Sharpe, Beall, Fagan, Minnich & McKee

[57] ABSTRACT

A first separation stage (A) separates nitrogen, carbon dioxide, and water vapor from atmospheric air. A mixture of oxygen and argon is passed from the first separation stage as the feed stock to a second separation stage (B). The second separation stage includes a pair of molecular sieve beds (90a, 90b) which adsorb oxygen and pass argon. The feed stock is passed to one of the beds such that the oxygen is adsorbed and the argon flows through to an argon discharge port (96). When the first bed is reaching saturation, a secondary product valve (108) closes the argon discharge port, a flush valve (82) supplies high purity oxygen to the bed, and a product conservation valve (104) causes the oxygen and argon gas in the interstitial voids of the saturated bed to be channeled to the other bed. The other bed is at reduced pressure by virtue of having just had its adsorbed oxygen desorbed. After the primary product flushing gas has flushed all of the argon from the interstitial voids of the saturated bed into the other bed, the saturated bed is connected with a low pressure collection tank (110) and a compressor (112) which desorbs the adsorbed oxygen and pumps it into a high purity oxygen receiver tank (116). As the saturated bed is being desorbed, the feed stock is supplied to the other bed. The process is repeated cyclically.

15 Claims, 3 Drawing Sheets

TWO STAGE SUPER-ENRICHED OXYGEN CONCENTRATOR

This application is a continuation-in-part of U.S. application Ser. No. 674,789, filed Mar. 25, 1991, and U.S. application Ser. No. 464,244 filed Jan. 12, 1990, now U.S. Pat. No. 5,002,591.

BACKGROUND OF THE INVENTION

The present invention relates to the art of gas separation. It finds particular application in the separation of substantially pure oxygen gas from atmospheric air and will be described with particular reference thereto. However, it is to be appreciated that the present invention is applicable to the purification of oxygen from other sources and to the separation or purification of other gases.

Heretofore, oxygen has been separated from atmospheric air by selective adsorption. Atmospheric air was cyclically pumped into one of a pair of beds filled with a physical separation material. The physical separation material, such as 5A zeolite, permitted the less strongly adsorbed molecules such as oxygen and argon, to pass therethrough, but trapped or retained the more strongly adsorbed molecules of nitrogen, carbon dioxide, and water vapor. When the trapping or adsorption capacity of the bed was substantially met, the air was pumped to the second bed while the first bed was evacuated or cleansed of the nitrogen and other adsorbed molecules.

Oxygen composes about 21% of atmospheric air whereas argon composes about 1%. When nitrogen, carbon dioxide, and other larger molecules are removed from atmospheric air leaving substantially only oxygen and argon, the percentages of both argon and oxygen in the separated gas increase about five fold. That is, even if the separator works perfectly, passing only oxygen and argon, the resultant product gas will be 4% to 5% argon and 95% to 96% oxygen. The purity of the resultant oxygen gas is theoretically limited by the argon content of atmospheric air to about 95.7% oxygen and 4.3% argon.

By carefully controlling the cycling of gas between the beds and other operating parameters, about 95% pure oxygen can be generated at the output to the beds. If too much air is passed into the system during a cycle, the adsorption capacity of the beds will be exceeded and the purity of the product oxygen becomes substantially less than the maximum theoretical purity of 95.7% or even the typically attainable 95%.

In the applicant's earlier U.S. Pat. No. 4,869,733, a second stage of purification was added. Specifically, the roughly 95% oxygen, 5% argon mixture was fed into a 4A zeolite bed which adsorbed oxygen but which passed argon. When the 4A bed was substantially saturated with oxygen, the bed was discontinued from the gaseous mixture supply. A downstream pump pumped the adsorbed oxygen from the second stage to an oxygen reservoir.

Another two stage oxygen concentration system is illustrated in U.S. Pat. No. 4,190,424 to Armond, et al. Armond utilized a rather complex valving system which alternately caused one of two carbon sieve beds to receive the oxygen-argon mixture while the other carbon sieve bed was connected with a pump which evacuated the adsorbed oxygen. The pair of carbon sieve beds discharged argon mixed with some oxygen as a waste or secondary product gas. The recovered primary product gas included not only the adsorbed oxygen, but also the mixture of oxygen and argon gas that filled the interstitial voids. The loss of oxygen with the waste argon gas and the recovery of argon with the primary product oxygen both resulted in inefficiencies in the Armond system.

In accordance with the present invention, a method and apparatus are provided for separating substantially pure oxygen efficiently from air.

SUMMARY OF THE INVENTION

In accordance With one aspect of the present invention, a feed stock gas, such as a mixture of oxygen and argon, is physically separated from other gaseous components such as nitrogen and the other constituents of atmospheric air. The feed stock mixture is alternately supplied to each of two molecular sieve beds which adsorb a primary product constituent gas, e.g. oxygen, and which pass a secondary product or waste gas, e.g. argon. When one of the beds is receiving the feed stock, the other bed is subject to a reduced pressure to extract the adsorbed primary product constituent. When the extraction of the adsorbed constituent from the one bed has been completed and when the molecular sieve material in the other bed is almost saturated, the two beds are connected in series such that gases passed by the almost saturated bed flow into the low pressure bed from which the adsorbed constituent has been extracted. By connecting the two beds in series, breakthrough feed stock which flows out of the first bed after the molecular sieve material is saturated is conveyed to the other bed for separation. The amount of primary product adsorbed constituent which is lost to the secondary product discharge port is reducible to a minimum heretofore unattainable.

In accordance with a more limited aspect of the present invention, as saturation of the first bed is approached, the supply of the oxygen-argon feed stock mixture is terminated and replaced with a flow of previously separated substantially pure primary product oxygen while the two beds are still connected in series. The substantially pure oxygen sweeps any argon in the interstitial voids of the molecular sieve bed out of the saturated bed and into the other bed. The other bed adsorbs not only the oxygen in the feed stock mixture which escapes from the first bed after saturation, but also any of the substantially pure oxygen gas that passes through the first bed. In this manner, when the beds are reversed and oxygen is extracted from the first bed, the first bed is free of even the 5% argon in the interstitial spaces rendering the extracted gas substantially pure oxygen. Moreover, because substantially all oxygen which passes through the first bed can be made to flow into the second bed, the discharged secondary product argon gas can be rendered relatively free of oxygen if it is desirable to maximize such secondary product purity.

In accordance with a further aspect of the invention, a valving means is provided for selectively connecting the two oxygen adsorbing beds in series with either bed upstream in the series. In this manner, the bed from which oxygen has most recently been extracted is always connected downstream from the bed that is approaching or has just exceeded saturation.

A primary advantage of the present invention is that it produces super-enriched oxygen from atmospheric air, which super-enriched oxygen is substantially pure.

Another advantage of the present invention resides in its high efficiency. Substantially all oxygen can be trapped and converted to primary product gas.

Another advantage of the present invention is that a substantially pure argon secondary product gas and a substantially pure nitrogen secondary product gas can be separately produced.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts, and in various steps and arrangements of steps. The drawings are only for purposes of illustrating a preferred embodiment and are not to be construed as limiting the invention.

BRIEF DESCRIPTION OF THE PREFERRED EMBODIMENTS

Figure 1A:
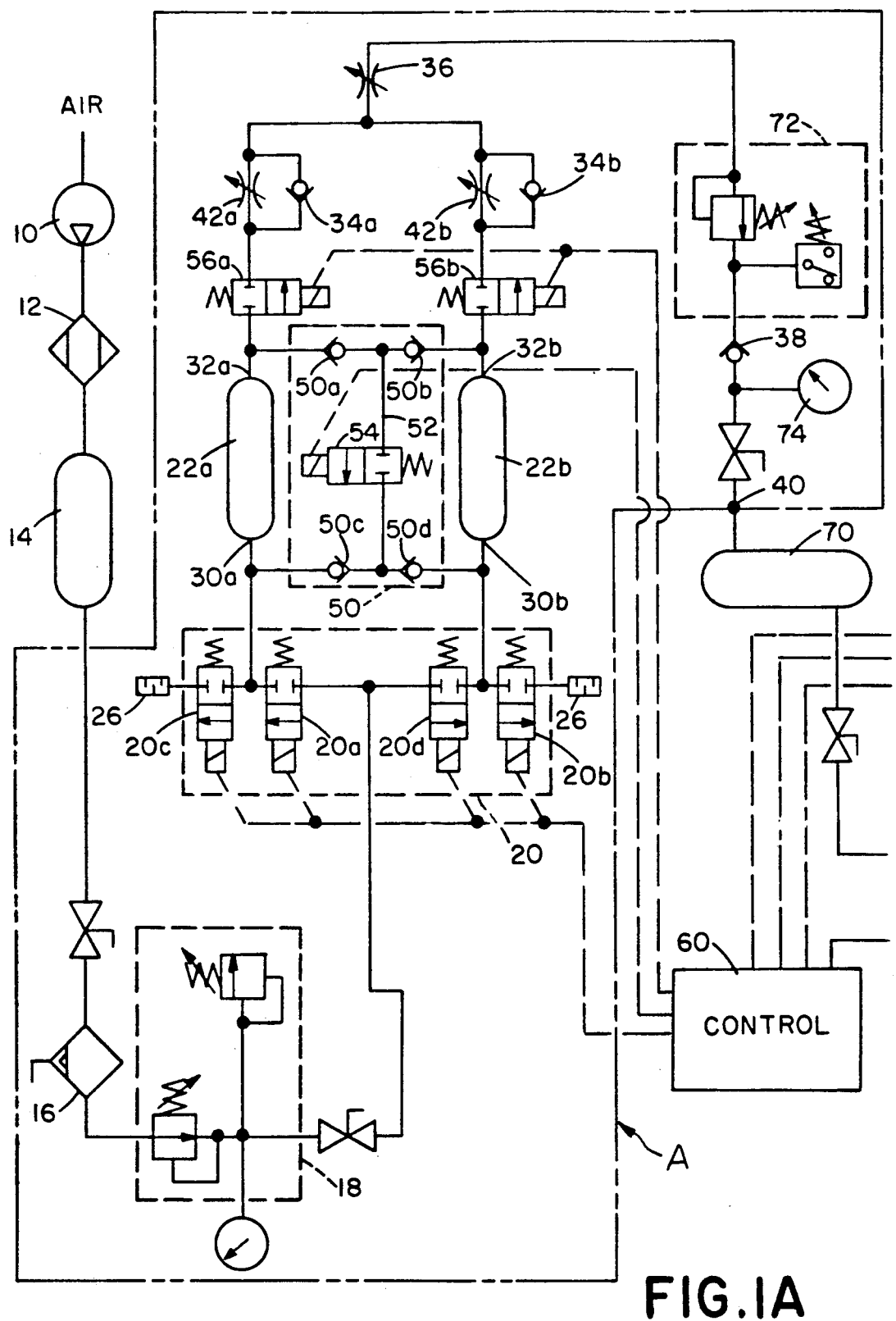
FIGS. 1A and 1B is a diagrammatic illustration of a two stage super-enriched primary product production apparatus in accordance with the present invention.
Figure 1B:
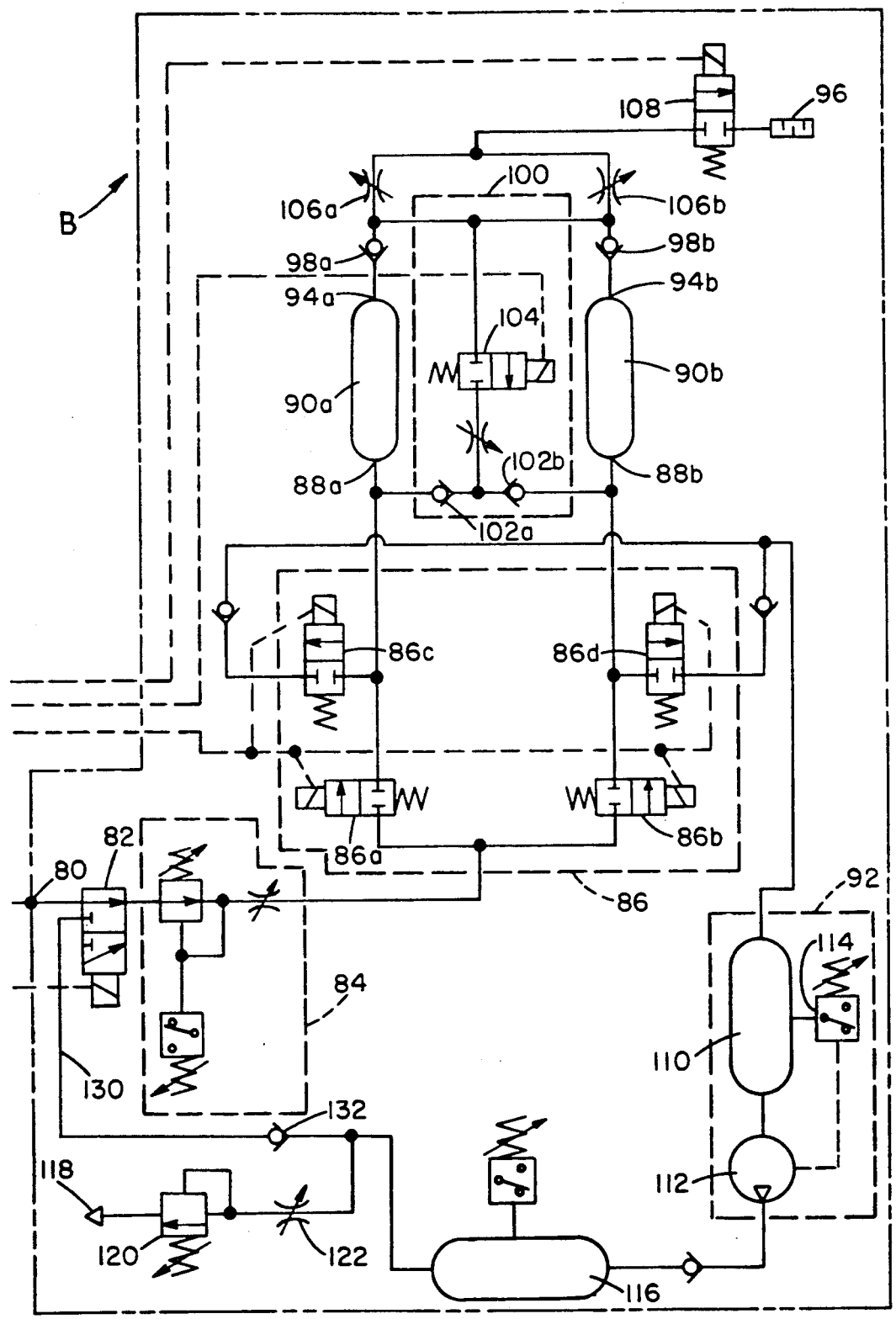

With reference to FIG. 1, a first separation stage A separates an oxygen-argon primary product gas from atmospheric air. Nitrogen, carbon dioxide, water vapor, and the like are adsorbed and discharged as a secondary product gas. The primary product gas passes through the first stage not adsorbed. A second or oxygen and argon separation stage B generates substantially pure oxygen as a primary product gas and substantially pure argon as a secondary product gas. It is to be appreciated, that although oxygen is the primary product gas in the preferred embodiment, the invention is equally applicable to the production of argon and other gases as the primary product gas.

A compressor 10 selectively supplies air under pressure to a coalescing filter 12 removes any oil, particulates, or other contaminants from the compressed air. The compressed air is stored in a compressed air receiver tank 14. A dryer 16 removes water vapor from the compressed air. A pressure regulation means 18 includes a pressure limiting valve and a safety relief valve for limiting the pressure supplied to the molecular sieve beds.

A cross over valve assembly 20 channels the compressed air alternately to molecular sieve beds 22a, 22b and alternately connects each molecular sieve bed with exhaust ports 26. Exhaust ports 26 may be connected with an inlet of a vacuum pump or vented to atmosphere. The cross over valve assembly 20 has three states. In a first state, a valve assembly 20a is open such that the first molecular sieve bed 22a receives the gaseous mixture under pressure from the compressor. A second valve 20b is also open such that the second molecular sieve bed 22b is connected with the exhaust ports 26. Valves 20c and 20d are closed. In a second state, Valves 20c and 20d are open and valves 20a and 20b are closed. In this manner, the second bed 22b receives the air under pressure from the compressor and the first bed 22a is connected with the exhaust ports. In a third state, all four valves portion 20a-20d are closed.

The first sieve bed 22a has a lower or input end 30a which is connected to the cross over valve assembly 20 and an upper or output end 32a through which oxygen or other primary product gas is discharged. The second sieve bed 22b analogously has a lower or input end 30b connected to the cross over valve assembly and an upper or output end 32b through which the primary product gas is discharged. A first check valve 34a permits the primary product gas from the first sieve bed to be channelled through a restrictor valve 36 and a check valve 38 to a primary product output port 40. A feedback restrictor 42b permits a small portion of the primary product gas from the first bed to be fed back into the output end 32b of the second bed. Analogously, a second check valve 34b permits the primary product gas from the second bed to be channelled to the output port 40 and a feedback restrictor valve 42a permits a small fraction of the second bed output to be fed back to the output end 32a of the first sieve bed.

A pressure equalization valving means 50 selectively interconnects the output end of one bed with the input end of the other. More specifically, a set of check valves 50a, 50b, 50c, and 50d permit gas to flow from the output end of the pressurized bed through a downcomer line 52 to the input end of a purged or evacuated bed when a pressure equalization valve 54 is open. The pressure equalization valve 54 is disposed at the lower most end of the downcomer line 52 immediately contiguous to check valves 50c and 50d. The check valves permit unidirectional flow between the inlet or outlets of the beds and the downcomer line. A product gas valving means, including valves 56a and 56b, selectively disconnects the outlet ends of the beds from the outlet port 40 and from each other. It is to be understood that line 52 is diagrammatically referred to as a "downcomer" line and does not necessarily imply a vertical orientation in any physical embodiment of this invention.

More specifically, a first T-connection interconnects the first bed output end 32a, check valve 50a and the check valve-feedback restrictor assembly 34a, 42a. A second T-connection interconnects with the second bed output end 32b, the check valve 50b, and the feedback-check valve arrangement 34b, 42b. The T-connections include first legs, respectively, that are connected with the first and second bed output ends, respectively. The T-connections have second legs, that are interconnected directly with the feedback means 42a, 42b, respectively. The T-connections have third legs, which are connected directly with first and second check valves 50a, 50b, respectively, which are connected directly to a first or uppermost end of the downcomer line 52. In this manner, the T-connection third legs define gas reservoirs or regions that are of minimal volume, which third leg volume is much smaller than the volume defined by the downcomer line between the uppermost end and the equalization valve 54.

Figure 2:
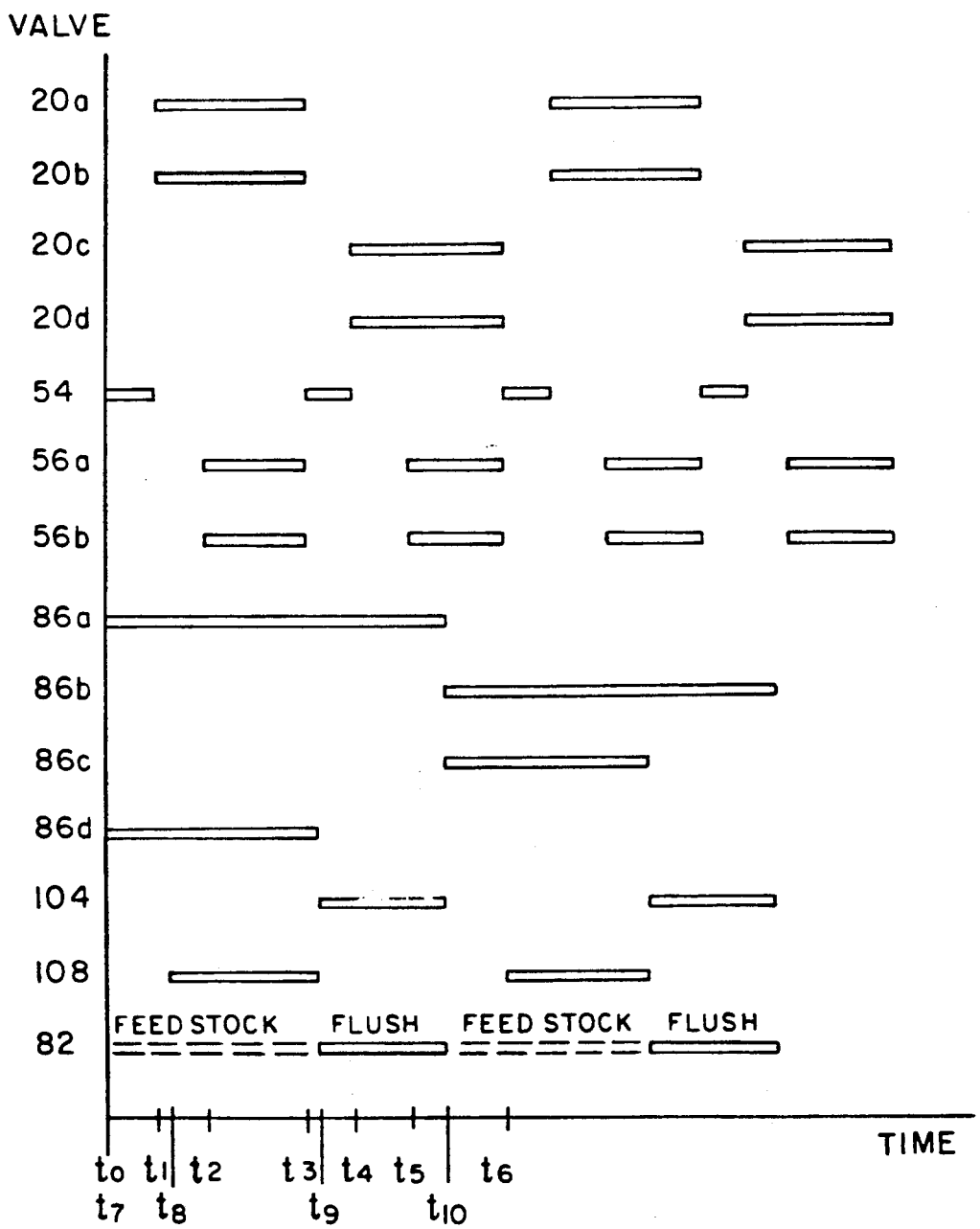
FIG. 2 is a timing diagram for the valves of FIG. 1.

With continuing reference to FIG. 1, and further reference to FIG. 2, at an arbitrary time $t_0$, the second bed 22b is fully pressurized and approaching breakthrough. At $t_0$, the cross over valve assembly 20 enters the third state, i.e. valves 20c and 20d are closed causing all of valves 20a-20d to be closed. This stops further pressurization of the second bed 22b and prevents further exhausting of the first bed 22a. The pressure equalization valve 54 is opened such that output product gas from the output end 32b of the second bed flows through check valve 50b, pressure equalization valve 54, and check valve 50c to the inlet end 30a of the previously exhausted first bed 22a. Valves 56a and 56b are also closed at $t_0$ to prevent any gas from flowing to the outlet port 40 or between outlet ends 32a and 32b of the two beds.

The pressure in the second bed 22b begins to drop from full pressurization as the pressure in the first bed 22a begins to rise from its minimum pressure. The pressure in the downcomer line is between the pressures of the two beds. The concentration of oxygen flowing from the second bed outlet end 32b to the inlet end 30a of the first bed begins to drop off rapidly as breakthrough occurs in the second bed. The decrease in pressure in the second bed 22b during pressure equalization permits some of the adsorbed nitrogen to be released. This causes the tail end of the equalization period to produce a greater concentration of nitrogen than the natural nitrogen concentration of atmospheric air.

When the first and second beds are substantially in equilibrium at time $t_1$ the pressure equalization period is terminated. The equalization period is terminated by closing equalization valve 54 and changing the cross over valve assembly 20 to its first state in which valves 20a and 20b are opened. After pressure equalization valve 54 closes, the check valves 50a and 50b permit gas at a higher pressure than the downcomer line to pass into the downcomer line until these pressures equalize. The change in states of valve assembly 20 may be triggered by a valve timing control means 60 or by a pressure sensor in the downcomer line.

At time $t_1$, the first and second beds have come into substantial pressure equilibrium. The contaminated primary product gas with the least oxygen or most nitrogen is retained in the first and third legs, of the second T-connection. The gas with the next most nitrogen or least oxygen is retained in the downcomer tube 52. The downcomer tube, the legs of the second T-connection and other portions of the path through which this gas has flowed are, of course, at the same pressure.

The equalization valve 54 may be closed earlier than pressure equalizations between beds 22a and 22b to allow only the most oxygen rich gas to be transferred at the cost of full pressure equalization. As yet another option, the cross over valve may continue to supply air to the pressurized bed after the equalization valve is open. This may be particularly advantageous if the adsorbed nitrogen is also a product gas which is recovered from the exhaust port 26.

Atmospheric air from the compressor 10 is pumped into the first bed 22a to increase its pressure as the second bed 22b is purged through the exhaust port 26. The product valves 56a and 56b may open at $t_1$ or may remain closed for a short duration after $t_1$ until a time $t_2$.

After the primary product valves 56a, 56b are opened at $t_2$, primary product gas is fed back through restrictor 42b, through the first and second legs, of the second T-connector, and into the second bed 22b in which pressure is continuing to decrease. This draws the heavily nitrogen contaminated gas that was discharged just before $t_1$ from the first and second legs of the second T-connector. Although some of the contaminated gas is drawn from the third leg, as the pressure rises, the heavily contaminated gas in the third leg is pushed toward the check valve 50b by oxygen-rich primary product gas that is feedback through restrictor 42b.

When the pressure in the second T-connection exceeds the pressure in the downcomer line 52 during repressurization, the check valve 50b opens, allowing the contaminated gas to be pushed into the downcomer line. Because, within practicality, the volume of the third leg is minimal relative to the downcomer line, a small amount of primary product gas may also pass through the check valve 50b to equalize the pressure in the downcomer line with the pressure at the output of the second bed. It should be noted that the displacement of low purity gas away from where it could contaminate the product stream is facilitated by the use specifically of check valves, since controlled valves would not allow any spontaneous passing of gas on a rise of pressure.

Just before the breakthrough occurs at the first bed at a time $t_3$ the cross over valve is moved to its third state, the pressure equalization valve 54 is opened, and the product valves 56a and 56b are closed. Product gas then flows from the outlet end 32a of the first sieve bed through check valve 50a, the pressure equalization valve 54 and check valve 50d to the inlet end 30b of the second bed. When substantial equilibrium is reached at $t_4$, the equalization valve 54 is closed and the cross over valve assembly 20 is moved to its second state. A short time later, $t_5$, the product valves 56a and 56b are opened and oxygen product gas is delivered to the outlet port 40. At time $t_6$, the cycle repeats.

Analogously, heavily contaminated gas from the end of the equalization cycle in which pressure from the first bed 22a is passed to the second bed 22b leaves a small amount of heavily contaminated gas in the first T-connection. The contaminated gas in the first and second legs, is pushed back into the first bed by gas fed back through the restrictor valve 42a as the first bed is being purged. The pressure increase of further purging to a pressure greater than the equilibrium pressure in the downcomer line 52 causes the remainder of the heavily contaminated gas that is trapped in the third leg to be pushed toward or through check valve 50a into the downcomer line. If any nitrogen contaminated gas in the third leg does not get pushed through the check valve by the feedback gas, it will be pushed through at the start of the next oxygen output cycle before it can be carried to the primary product port.

It will be noted that placing the pressure equalization control valve 54 at the lowermost practical point of the downcomer line maximizes its useful volume which minimizes blow down and wastage of clean breakthrough gas at exhaust and facilitates receipt of the heavily contaminated breakthrough gas from the third leg of the T-connections. The use of check valves 50a, 50b assures that the downcomer line and the output of the primary product gas producing bed do not become interconnected until the primary product gas pressure exceeds the downcoming line pressure. This is important for certain control cycle schemes for if these valves were to experience actuation or deactivation delays, as controlled valves might, when the downcomer line had a higher pressure than the primary product gas, then heavily contaminated breakthrough gas would be pushed from the downcomer line into the primary product gas. The use of check valves eliminates any timing delays that would be necessary with controlled valves to assure that this reverse flow of contaminated breakthrough gas does not occur.

With reference again to FIG. 1, a surge tank 70 stores a supply of the oxygen-argon feed stock mixture at the output of the first stage A and the input to the second stage B. The feed stock in the surge tank is at an elevated pressure, albeit at a lower pressure than the input pressure to the first stage. In addition to the pressure drop attributable to the molecular sieve beds of the first stage, a pressure regulation system 72 regulates the pressure such that the pressure in the surge tank is limited to a preselected pressure. The actual pressure in the surge tank is indicated on a man-readable gauge 74.

The second stage has an inlet port so which receives the roughly 95% oxygen, 5% argon feed stock from the surge tank 70. In the first portion of the cycle, a flush valve 82 connects the oxygen-argon feed stock mixture from the first stage through a pressure regulation system 84 to a valve assembly 86. The pressure regulation means 84 regulates the pressure to a preselected pressure and flow rate for which other system parameters have been optimized.

The valve assembly 86 includes valves 86a and 86b for selectively connecting first ends 88a and 88b of molecular sieve beds 90a and 90b with the feed stock mixture.

The valve assembly also includes valves 86c and 86d for selectively connecting the first ends of the first and second beds, respectively, with a low pressure means 92 for selectively withdrawing adsorbed oxygen from the molecular sieve beds. In the preferred embodiment, the molecular sieve beds contain a material which adsorbs oxygen and which passes argon and nitrogen, such as activated carbon or 4A zeolite.

The first and second beds have second ends 94a, 94b through which the first and second beds are connected with an argon output port 96. Check valves 98a and 98b assure unidirectional flow of secondary product and breakthrough feed stock gas from the bed second ends.

A transfer means 100 selectively connects the first and second beds in series. Check valves 98a and 98b along with check valves 102a and 102b automatically connect the beds in series such that the bed under higher pressure is connected upstream from the bed at lower pressure. A primary product conservation or transfer valve 104 is opened and closed to connect the beds in series.

Restrictors 106a and 106b along with an argon or secondary product valve 108 selectively control the flow of argon or other secondary product gas to the secondary product port 96.

The low pressure means 92 includes a low pressure collection tank 110 which is held at a low, but preferably positive, pressure by a vacuum pump or compressor 112. A pressure monitoring means 114 operates the Compressor 112 to hold the low pressure collection tank 110 at a positive pressure which is lower than the pressure set by the pressure regulating means 72 and lower than the pressure set by the pressure regulating means 84. Although a positive pressure is preferred, the low pressure collection tank 110 may also be held at a negative pressure, i.e. a vacuum or even eliminated. The compressor 112 supplies primary product gas, particularly oxygen, to a high purity oxygen receiver tank 116. High purity oxygen is supplied from the receiver tank 116 to a primary product or oxygen output port 118. A pressure regulating means 120 regulates the pressure at which high purity oxygen is supplied and a restrictor 122 regulates its flow rate.

A feedback path 130 selectively feeds back a portion of the high purity oxygen from the receiver tank 116 to the flush valve 82. A check valve 132 assures unidirectional flow through the feedback path.

With continued reference to FIG. 1 and further reference to FIG. 2, the first and second stages function asynchronously. That is, the cycling of the cross over valve assembly 20 need not be at the same times, the same periodicity, nor at the same repeat time as valve assembly 86. Rather, the two work independently. At a time $t_7$, the flush valve 82 connects the inlet port so with valve assembly 86. Valve 86a opens allowing the feed stock to be supplied to the first bed 90a. Valve 86d also opens allowing oxygen adsorbed in the second bed 90b in an earlier half cycle to be extracted by the low pressure means 92. The feed stock continues to be supplied to the first bed 90a until the sieve material is almost saturated with oxygen. When the pressure in bed 90a has reached a preselected operating pressure at $t_3$, the argon or secondary gas control valve 108 opens allowing argon gas which has passed through the first molecular sieve bed without being adsorbed to be discharged at the secondary gas output port 96. At time $t_9$ just before breakthrough, i.e. just before the molecular sieve material in bed 90a becomes saturated allowing feed stock to pass through the second end 94a, valves 86d and 108 close. The flush valve 82 connects the feedback path 130 with the valve assembly 86 and the product conservation valve 104 connects the second end 94a of the first bed with the first end 88b of the second bed. Because the second bed was pumped down to the low pressure of low pressure collection tank 110, the second bed 90b is at a lower pressure than the first bed 90a. By a time $t_{10}$, the feedback substantially pure oxygen has swept all of the feed stock and secondary product gas from the interstitial voids between particles of the molecular sieve material of the first bed 90a, as well as from all the plumbing and valves between flush valve 82 and the check valve 98a. At time $t_{10}$, valves 86a and 104 open. At time $t_{10}$, the molecular sieve material in the first bed 90a is saturated with adsorbed oxygen and the interstitial spaces of the first bed 90a are filled with pure oxygen.

It will be noted that the oxygen and argon gases that are pushed from the first bed 90a in the flushing process are not lost or discharged from the secondary product outlet 96. Rather, because the transfer valve 104 connects the two beds in series, the argon gas that passes through the first bed second end 94a before saturation and the oxygen and argon mixture that passes through the second end 94a after breakthrough are both passed through the inlet 88b into the second bed 90b where the oxygen is adsorbed. Likewise, any substantially pure oxygen that might be passed through the first bed 90a during flushing also passes into the second bed 90b for adsorption. Thus, by connecting the two beds in series with the bed that recently had the adsorbed oxygen extracted assures that all the primary product gas is adsorbed with none passing to the secondary gas outlet port. On the other hand, because the saturated bed has been also flushed of all argon, it contains substantially no argon to be extracted as primary product gas.

At time $t_{10}$ the cycle starts again, but with the beds reversed. It might be noted that because the second stage B is processing only about 20% of the volume of gas as the first stage A, it can either cycle more slowly, use smaller molecular sieve beds, or a combination of the two.

During the adsorption portion of the cycle as oxygen is adsorbed, the gas in the interstitial voids becomes disproportionately rich in argon. As the bed reaches saturation, the feed stock gas begins to displace the substantially pure argon interstitial gas. Due to diffusion, breakthrough of the feed stock into the secondary product stream is normally not sudden, but is evidenced by an increasing oxygen purity. As the argon-rich gas and the breakthrough feed stock flow to the other bed during the transfer portion of the cycle, the pressure in the saturated bed decreases causing the gas to expand. Thus, the pressure reduction reduces the amount of interstitial gas to be flushed by the substantially pure oxygen from the feedback path. In this manner, the argon and feed stock expulsion is accomplished by a combination of partial depressurization and product purging or flushing. The relative amounts of depressurization and substantially pure oxygen purging can be adjusted either to optimize oxygen purity or to minimize energy expenditure.

Preferably, the low pressure collection tank 110 is large relative to the volume of the beds 90a and 90b to allow the bed to blow down to a low but positive pressure with a minimum of back pressure.

The first stage A passes the primary product and adsorbs the secondary product; whereas, the second stage B adsorbs the primary product and passes the secondary product. The feed stock expulsion of the second stage B is different from the pressure equalization of the first stage A in that the feed stock expulsion prepares the bed contributing the pressure; whereas, the pressure equalization prepares the bed receiving the pressure. Unlike the pressure equalization technique, feed stock expulsion does not normally leave the beds in pressure equilibrium. Preferably, the contributing bed remains at about twice the pressure as the receiving bed. The purpose of the feed stock expulsion is cleansing, not pressurizing. By contrast, the pressure equalization in the first stage A is primarily concerned with efficiency. Pressure equalization minimizes the amount of compressive work that needs to be done by recovering pressure that would otherwise be exhausted. The purpose of feed stock expulsion of the second stage B is product purity. In feed stock expulsion, the primary product gas pushes feed stock out of the top of the bed being purified into the bottom of the other bed.

As an alternate embodiment, the feed stock expelled from the first bed of the second stage B need not go to another molecular sieve second bed. Rather, this material may be channeled to a holding tank or vessel until after the oxygen is extracted from the first bed. Material in the holding tank can then be returned to the inlet end of the first tank along with the feed stock at the commencement of the next cycle.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiments, the invention is now claimed to be:

1. A method of separating a primary product gas from a gaseous feed stock, the method comprising:
    feeding a flow of the feed stock under positive pressure into a first bed of molecular sieve medium which adsorbs the primary product gas and passes a secondary product gas therethrough;
    terminating the flow of the feed stock to the first bed and holding the first bed under pressure;
    while continuing to hold the first bed under pressure, supplying the primary product gas under pressure to the first bed to flush feed stock and secondary product gas from interstitial voids of the molecular sieve medium under pressure into a second vessel;
    recovering the primary product gas adsorbed on the molecular sieve medium of the first bed at a positive pressure;
    increasing the positive pressure of at least a portion of the recovered primary product gas to a sufficient pressure to flush the feed stock and the secondary product gas from the interstitial voids when supplied under pressure to the first bed.

2. The method as set forth in claim 1 wherein the feeding of the feed stock to the first molecular sieve bed continues until the molecular sieve bed is close to saturated.

3. The method as set forth in claim 1 wherein the second vessel is a second bed of the molecular sieve medium.

4. The method as set forth in claim 1 wherein the recovering of the adsorbed primary product gas includes connecting the first bed with a low, positive pressure collection tank which is maintained at a positive pressure lower than the first bed to desorb the primary product gas from the molecular sieve material therein.

5. A method of separating a primary product gas from a mixture of the primary product gas, a secondary product gas and at least a third product gas, the method comprising:
    separating a feed stock of the primary and secondary product gases from the third product gas;
    feeding the feed stock of the primary and secondary product gases to a bed of molecular sieve material which adsorbs the primary product gas and which passes the secondary product gas;
    continuing feeding the feed stock of the primary and secondary product gases to the bed passing the secondary product gas therefrom while adsorbing the primary product gas until the molecular sieve material of the bed is substantially saturated with adsorbed primary product gas;
    terminating the feeding of the feed stock to the bed and commencing the feeding of substantially pure primary product gas at positive pressure to replace and expel non-adsorbed feed stock and secondary product gas from interstitial voids of the molecular sieve material;
    desorbing the adsorbed primary product gas from the molecular sieve material of the bed at positive pressure.

6. The method as set forth in claim 5 wherein the expelled non-adsorbed feed stock and secondary product gas from the interstitial voids are transferred to a vessel.

7. The method as set forth in claim 6 wherein the vessel is filled with the molecular sieve material which adsorbs the primary product gas and passes the secondary product gas.

8. The method as set forth in claim 5 wherein the desorbing of the adsorbed primary product gas includes connecting the bed with a low, positive pressure collection tank which is maintained at a positive pressure lower than the bed to desorb the primary product gas therefrom.

9. The method as set forth in claim 5 wherein the substantially pure primary product gas is fed to the bed at a pressure at least as high as the feed stock such that the substantially pure primary product gas flushes the feed stock from the interstitial voids without reducing pressure in the bed prior to the feeding of the substantially pure primary product gas.

10. A method of separating oxygen from air, the method comprising:

separating a feed stock of the oxygen and argon from the air;

feeding the feed stock at a positive pressure to a first bed of a molecular sieve medium which adsorbs the oxygen and which passes the argon;

continuing the feeding of the feed stock to the first bed adsorbing the oxygen and passing the argon until the first molecular sieve medium of the first bed is substantially saturated;

terminating the feeding of the feed stock to the first bed and supplying substantially pure oxygen under sufficient positive pressure to the first bed to flush the feed stock and argon from interstitial voids of the first molecular sieve bed into a second bed of the molecular sieve medium under positive pressure;

terminating the supplying of the substantially pure oxygen to the first bed;

desorbing substantially pure oxygen from the first bed and supplying the feed stock to the second bed;

continuing the feeding of the feed stock to the second molecular sieve bed adsorbing the oxygen and passing the argon until the second molecular sieve bed is substantially saturated;

terminating the feeding of the feed stock to the second bed and supplying the substantially pure oxygen at positive pressure to flush the feed stock and argon from the interstitial voids of the second molecular sieve bed into the first molecular sieve bed under positive pressure;

terminating the flushing of the second bed with the substantially pure oxygen;

desorbing substantially pure oxygen from the second bed and supplying the feed stock to the first bed.

11. The method as set forth in claim 10 wherein the substantially pure oxygen is at least 99% pure.

12. An apparatus for separating oxygen from air, the apparatus comprising:

a first gas separating means for separating an oxygen and argon mixture from the air;

a   beds of a molecular sieve medium which adsorb the oxygen and pass the argon;

a valving means for selectively connecting a first end of the first and second molecular sieve beds with the first gas separating means for selectively supplying the oxygen and argon mixture to the first end of one of the beds, whereby the bed receiving the mixture adsorbs the oxygen and passes the argon through a second end thereof;

an argon output port connected with the bed second ends;

a means for selectively connecting the first and second beds in series such that gas is discharged from the second end of one of the beds is conveyed into the other bed;

a low pressure oxygen collection tank;

a means for monitoring and controlling a pressure within the low pressure collection tank; and a compressor means controlled by the monitoring and controlling means for reducing the pressure in the collection tank to a preselected low positive pressure, such that pressure in the collection tank, the pair of beds, and the valving means remain above ambient atmospheric pressure to assure that volatile contaminant gases do not leak into and collect in the collection tank.

13. The apparatus as set forth in claim 12 further including a high purity oxygen tank connected with the compressor means for receiving the oxygen therefrom under a high positive pressure.

14. The apparatus as set forth in claim 13 further including a flushing valve means for selectively terminating the supply of the oxygen and argon mixture to the valve assembly and supplying oxygen from the high purity oxygen tank thereto, whereby the high purity oxygen is supplied to one of the beds flushing the oxygen and argon mixture from interstitial spaces thereof.

15. An apparatus for separating a substantially pure primary product gas from secondary and tertiary product gases, the apparatus comprising:

a first gas separating means for separating a feed stock mixture of the primary and secondary product gases from the tertiary product gas and supplying the primary and secondary product gases at a first positive pressure;

a pair of beds of a molecular sieve medium which adsorb the primary product gas and pass the secondary product gas;

a valving means for selectively connecting a first end of the first and second molecular sieve beds with the first gas separation means for selectively supplying the feed stock mixture to the first end of one of the beds, whereby the bed receiving the feed stock mixture of the primary and secondary gases adsorbs the primary gas and passes the secondary gas through a second end thereof;

a secondary gas output port connected with the bed second ends;

a means for selectively connecting the first and second beds in series such that gas discharged from the second end of one of the beds is conveyed into the other bed;

a low pressure primary product collection tank operatively connected with the molecular sieve beds for selectively receiving adsorbed primary product gas from each of the molecular sieve beds at a pressure less than the first positive pressure;

a compressor means for compressing the primary product gas in the collection tank to at least the first positive pressure;

a flushing valve means for selectively supplying primary product gas at at least the first positive pressure from the compressor means to each one of the bed first ends for selectively flushing the feed stock mixture and secondary product gas from interstitial voids of the molecular sieve material of each selected one of the first and second beds to the other.

* * * * *